United States Patent [19]

Bruni et al.

[11] Patent Number: 4,467,041

[45] Date of Patent: Aug. 21, 1984

[54] SILICOCALCAREOUS MASS WITH HIGH POROSITY AND ITS PREPARATION

[75] Inventors: Maurice Bruni, Tremblay-les-Gonesse; Georges Delode, Champigny-sur-Marne; Rolland Perraudin, Bagnolet, all of France

[73] Assignee: L'Air Liquide - Societe Anonyme pour l'Etude et l'Exploitation des Procedes George Claude, Paris, France

[21] Appl. No.: 330,450

[22] Filed: Dec. 14, 1981

[30]     Foreign Application Priority Data

May 13, 1981 [FR] France ................................ 81 09538

[51] Int. Cl.$^3$ ...................... C04B 21/00; C04B 43/02; C04B 43/12

[52] U.S. Cl. ...................................... 501/80; 106/120; 252/62

[58] Field of Search ........................... 501/80; 106/120; 252/62

[56]     References Cited

U.S. PATENT DOCUMENTS

| | | | |
|---|---|---|---|
| 3,406,030 | 10/1968 | Perrandin et al. | 106/86 |
| 3,501,323 | 3/1970 | Moorehead | 106/120 |
| 3,895,096 | 7/1975 | Helser et al. | 501/80 |
| 3,988,419 | 10/1976 | Mori | 106/120 |
| 4,115,140 | 9/1978 | Hums et al. | 106/120 |
| 4,118,450 | 10/1978 | Nakamura et al. | 501/80 |
| 4,128,434 | 12/1978 | Pasch | 106/120 |
| 4,131,638 | 12/1978 | Whitaker et al. | 106/120 |
| 4,193,958 | 3/1980 | Uchida et al. | 106/120 |
| 4,238,240 | 12/1980 | Krijgsman | 106/120 |

FOREIGN PATENT DOCUMENTS

| | | |
|---|---|---|
| 2318135 | 10/1974 | Fed. Rep. of Germany . |
| 2644116 | 4/1978 | Fed. Rep. of Germany . |
| 2832194 | 1/1980 | Fed. Rep. of Germany . |

OTHER PUBLICATIONS

*Chemical Abstracts,* vol. 79, No. 6, Sep. 24, 1973, 69812q.

*Chemical Abstracts,* vol. 79, No. 5, Sep. 10, 1973, p. 263, 57195c.

*Chemical Abstracts,* vol. 88, p. 366, 176140b.

*Primary Examiner*—Mark Bell
*Attorney, Agent, or Firm*—Browdy and Neimark

[57]    ABSTRACT

A silicocalcareous mass with high porosity is obtained by using, in at least partial replacement of the usual silica, ultrafine synthetic silica with a large specific surface of 200 to 500 m$^2$ per gram to a paste of lime and silica, and possibly adding nonreactive synthetic fibers of organic or inorganic origin. The silicocalcareous mass with high porosity can be used in the field of lining materials for containers intended to store dissolved gases and in the field of insulation materials.

7 Claims, No Drawings

SILICOCALCAREOUS MASS WITH HIGH POROSITY AND ITS PREPARATION

FIELD OF THE INVENTION

This invention relates to a silicocalcareous mass with high porosity, usable especially in the field of lining materials for containers intended to store dissolved gases and in the field of insulation materials.

BACKGROUND OF THE INVENTION

In current industrial practice, known porous silicocalcareous masses are made from a thorough mixture of lime, ground silica or fossil silica and asbestos suspended in water. The resulting paste introduced into containers, molds or bottles, is then subjected to heat in an autoclave to initiate and complete the lime-silica reaction which gives rise to the silicocalcareous material; then it is transferred to a drying furnace to remove the water and create the desired porosity.

Asbestos is added to the aqueous composition of silica and lime for its effect as a reinforcing fiber and suspension agent. However, recent constraints related to health and safety connected with the handling of asbestos have led to reconsideration of the use of this natural fiber whose characteristic properties, in the manufacture of porous silicocalcareous masses, are useful in strengthening the crystalline structure and contributing to the maintenance of the suspension of the solid products, silica and lime, in a large amount of water.

It is known that the stabilization of the suspension can be markedly improved by the use of suspension agents. USP 3,406,030 discloses the effect of adding substantial amounts of organic agents, up to 10%, for suspension purposes. Certain cellulose derivatives such as alkylhydroxyalkylcelluloses, in particular methyl and ethylhydroxyethylcelluloses, make it possible to obtain an excellent stabilization of the suspension. The dose to be introduced varies with the degree of stabilization sought and the nature of the suspension agent.

Compensating for the discontinuance of asbestos by adding organic suspension agents in large amounts has been considered. While it has been shown that the addition of an organic suspension agent in a large amount can appreciably correct the defect of decanting the solid products during the manufacture of the silica/lime and water paste, on the other hand, due to the fact of the destruction of this type of organic compound during the firing of the paste, a lowering of the mechanical properties of the dried silicocalcareous masses with high porosity has been noted. The fragility and friability of the porous materials thus obtained are such that they render them unsuitable for the applications concerned.

SUMMARY OF THE INVENTION

It has therefore been sought to develop a thixotropy phenomenon soon after the filling of the bottle or mold, which would make it possible to line the bottle or mold with a very liquid mixture, the setting of the paste then being achieved before putting the containers in the autoclave.

It has been found that adding ultrafine synthetic silica with a large specific surface of 200 to 500 $m^2$ per gram as a total or partial replacement for the ground silica makes it possible very advantageously to obtain homogeneous silicocalcareous masses with high porosity that exhibit satisfactory mechanical properties.

DETAILED DESCRIPTION OF PREFERRED EMBODIMENTS

The ultrafine synthetic silicas have a granulometry on the order of several microns. They appear in the form of very light powder with an apparent specific weight on the order of 0.25 kg/$dm^3$ capable of absorbing more than four times their weight in water. These ultrafine silicas are made by pyrogenation of silicon tetrachloride or by precipitation of soluble silicates.

The aqueous paste with a base of a mixture of divided silica and lime contains at least 50% ultrafine synthetic silica, and the ultrafine silica is very advantageously used in an amount between 70 and 100% in relation to the total amount of silica. The total amount of silica used is slightly greater than that of the lime, in a proportion of 10 to 20% excess and the water is used in an amount at least three times greater than the solids, preferably at a rate of 3.5 to 4.6 times the total quantity of solids.

When a silicocalcareous material with particularly high porosity, having a high mechanical strength, not friable when it is crushed, is prepared, it has been found advantageous to proceed with a slight addition of nonreactive hydrophilic synthetic fibers of organic or inorganic origin having a good mechanical strength. The presence of these fibers improves the toughness of the porous material, rendering the product less fragile under shock. These synthetic fibers are introduced into the porous material in a rate of 3 to 15% in relation to the solids, preferably 4 to 6%. Of the inorganic synthetic fibers, synthetic alumina silicate fibers which lead to advantageous results can be cited.

Synthetic fibers of the carbonaceous fibers type are of the greatest interest with regard to obtaining a very tough material. These very strong and very fine carbonaceous fibers are obtained by pyrolysis of acrylic fibers at the 600° C. stage whereas at 1200° C. carbon fibers are obtained and at 2000° C. graphite fibers.

The paste is prepared by adding various constituents to the water, in the following order: quicklime, ground silica (if any), ultrafine silica and synthetic fiber, with stirring for 5 to 20 minutes until a thorough mixture is obtained. The resulting liquid paste is then quickly put into bottles, containers or molds, in a partial vacuum. The bottles are then fitted with a porous plug and held in an autoclave for a firing lasting between 17 and 24 hours under a saturated steam pressure of about ten bars, then subjected to a gradual drying for several days, e.g. about four days, at a maximum temperature of 330° C.

The first stage of operation involves slaking of the quicklime by thoroughly mixing it with a portion of water. Addition of the synthetic fibers to the paste can be done at one time. The process of the application makes it possible to obtain silicocalcareous masses with high porosity, that can be greater than 90%.

These porous materials are particularly suited for lining of containers and bottles intended for storing dissolved gases, especially acetylene. The nature of these materials makes them advantageous in the field of thermal insulation, and also in construction, on the outside as an antimoisture barrier and on the inside as soundproofing.

Examples are given below which illustrate the invention in a nonlimiting way.

EXAMPLE 1

In a mixer, 48.7 kg of quicklime are thoroughly mixed in 200 liters of water, with stirring for 10 to 15 minutes, to perform the complete slaking of the lime. Then, in order, 186 liters of water, 15 kg of ground silica (100µ) and 41 kg of ultrafine synthetic silica are added, maintaining the stirring for 10 to 15 minutes until there is obtained a homogeneous liquid paste which is rapidly put, under a partial vacuum of about 600 millibars, into bottles intended for use for the storage of acetylene in the dissolved state.

The full bottles are then fitted with a porous plug before being placed in an autoclave. The period of firing in an autoclave is 20 hours under a saturated steam pressure of 10 bars. Then a gradual drying for 4 days, at a maximum temperature of 330° C., is effected.

After drying, the porous masses contained in the bottles are homogeneous and exhibit a longitudinal contraction less than 1 mm and a crushing strength of 15 to 20 kgs/cm$^2$, and a porosity of 90%±1%.

EXAMPLE 2

At one time, 423 liters of water, 50 kg of quicklime, 57.5 kg of ultrafine silica and 7 kg of synthetic alumina silicate fibers are mixed, while stirring for 20 minutes, before transfer into bottles. After firing and drying under the same conditions as in Example 1, the bottles contain a homogeneous porous mass testing 89%±1% porosity and having from 10 to 20 kg/cm$^2$ of mechanical strength.

EXAMPLE 3

In a first stage, 250 liters of water and 50 kg of quicklime are mixed, for 15 minutes, to perform the complete slaking of lime (final temperature 56° C.±10° C.). After that, the mixture is transferred to a mixer; then, in order, 148 liters of water, 8 kg of ground silica (100µ) and 49.5 kg of ultrafine silica are added, until a homogeneous paste is obtained, after five minutes of mixing, into which 5.5 kg of carbonaceous fibers are introduced at one time. After firing and drying under the conditions indicated in Example 1, the porous material exhibits the following physical characteristics: porosity 90%±1% and crushing strength of 20 to 35 kg/cm$^2$.

EXAMPLE 4

A slaking of 50 kg of quicklime of 95% minimum purity in 300 liters of water is effected, while maintaining a vigorous stirring for 10 minutes; then 205 liters of water and 59 kg of ultrafine silica are introduced with stirring, and the stirring is maintained for 20 minutes.

At one time 4 kg of thoroughly shredded carbonaceous fibers are added and the stirring is continued for 10 minutes after the introduction of the fibers. The suspension put into the bottles, is subjected to a firing under 11 bars of saturated steam vapor for 20 hours, and is then gradually dried at atmospheric pressure at a maximum temperature of 330° C. to constant weight. Silicocalcareous material, thus prepared, has the following characteristics: a porosity of 92%±1%, density of 0.210±0.05, crushing strength of 15 to 20 kg/cm$^2$.

It will be obvious to those skilled in the art that various changes may be made without departing from the scope of the invention and the invention is not to be considered limited to what is described in the specification.

We claim:

1. In a process for preparing a silicocalcareous mass having high porosity, comprising firing an aqueous paste having a silica and lime mixture base, the improvement wherein the paste consists essentially of lime, water, about 3–15% based on solids of synthetic fibers, and silica made up at least in part by ultrafine synthetic silica, wherein the aqueous paste contains at least 50%, based on total silica, of ultrafine synthetic silica with a large specific surface of 200 to 500 m$^2$ per gram, the total amount of silica being slightly greater than the amount of lime in a proportion of 10 to 20% excess and the water being present in an amount at least three times greater than that of the solids.

2. Process for preparing a silicocalcareous mass with high porosity according to claim 1, wherein the aqueous paste with a base of a divided silica and lime mixture contains from 70 to 100% ultrafine synthetic silica with a large specific surface of 200 to 500 m$^2$ per gram, based on the total silica.

3. Process for preparing a silicocalcareous mass with high porosity according to claim 1 or 2, wherein said synthetic fibers are nonreactive and of organic or inorganic origin.

4. Process for preparing a silicocalcareous mass with high porosity according to claim 3, wherein the nonreactive synthetic fibers of inorganic origin are synthetic alumina silicate fibers or carbonaceous fibers.

5. Process for preparing a silicocalcareous mass with high porosity according to claim 1, wherein the paste components are added to the water in the following order: quicklime, silica and synthetic fibers with stirring for 5 to 20 minutes until there is obtained a liquid paste, said liquid paste is rapidly introduced into a container under partial vacuum, said filled container is fitted with a porous plug and is held in an autoclave for a firing lasting on the order of 17 to 24 hours under a saturated steam pressure of about ten bars, and the so-fired container is then subjected to a gradual drying for several days at a maximum temperature of 330° C.

6. Process according to claim 1 wherein said water is present in an amount of 3.5–4.6 times the weight of solids.

7. Process according to claim 3 wherein said synthetic fibers are present in an amount of 4–6% based on the solids.

* * * * *